United States Patent [19]
Werner

[11] 3,883,122
[45] May 13, 1975

[54] SCREW EXTRUDER

[75] Inventor: Hans Werner, Stuttgart-Nord, Germany

[73] Assignee: Werner & Pfleiderer, Stuttgart, Germany

[22] Filed: Feb. 15, 1974

[21] Appl. No.: 442,753

[30] Foreign Application Priority Data
Apr. 27, 1973 Germany.......................... 2321325
Feb. 27, 1973 Germany.......................... 7307358

[52] U.S. Cl. .............................................. 259/192
[51] Int. Cl. ........................... B29b 1/10; B01f 7/08
[58] Field of Search ............. 259/191, 192, 193, 97, 259/9, 10, 25, 26, 45, 46, 6, 21, 41; 425/207, 208, 209, 206; 100/145

[56] References Cited
UNITED STATES PATENTS

| | | | |
|---|---|---|---|
| 3,078,511 | 2/1963 | Street | 259/192 |
| 3,131,433 | 5/1964 | Volland | 259/191 |
| 3,779,522 | 12/1973 | Loomans | 259/192 |
| 3,780,994 | 12/1973 | Kneller | 259/191 |
| 3,823,921 | 7/1974 | Brennan | 259/192 |

*Primary Examiner*—Robert W. Jenkins
*Attorney, Agent, or Firm*—Hane, Baxley and Spiecens

[57] ABSTRACT

There is disclosed a screw extruder for processing synthetic plastics and other material of it consistency and, more particularly, a twin-screw extruder in which two extruder screws are rotatably mounted in a casing including two parallel cylindrical intersecting bores. The flights on each screw shaft are interrupted to form two facing sections free of flights. An inner bushing is mounted on the flight-free section of each shaft secured against rotation relative to the shaft and an outer bushing is inserted into each bore of the casing in registry with the respective inner bushing and secured against rotation relative to the casing. The outer diameter of the inner bushings and the inner diameter of the outer bushings are so correlated that a gap is defined between the two bushing walls. This gap has a uniform radial width along its length and constitutes a shear gap. The radial width of the gap can be varied while maintaining the uniform width of its by forming the inner wall of the outer bushing and the outer wall of the inner bushing with a conical configuration and axially displacing the bushings relative to each other. Each gap constitutes a shear gap generating shear forces to which the material is subjected as being conveyed through the extruder. These shear forces can be accurately controlled by varying the radial width of the shear gaps while maintaining uniformity of the shear forces along the length of the gap.

8 Claims, 6 Drawing Figures

SCREW EXTRUDER

The invention relates to a screw extruder for processing synthetic plastics and other materials of kneadable or pliable consistency and, more particularly, to a screw extruder with two or more screw shafts rotatably supported in parallel intersecting cylindrical bores in the casing of the extruder.

BACKGROUND

Uniform distribution of additives and, particularly, partly agglomerated additives in a kneadable or pliable material of low viscosity, for instance, distribution of additives such as pigments or soot in a melt of synthetic plastics, requires that virtually each particle of the additive is once or several times forcibly exposed to a powerful field of shear forces. The same powerful shear forces must be used for satisfactory mechanical plasticizing of, for instance, a synthetic plastics. For such plasticizing of plastics it is also necessary that each particle is forced to pass through an intensive field of shear forces to avoid lack of homogenity in the plasticized material.

There are known several types of devices which are satisfactorily operated with single screw extruders. Suitable devices are disclosed, for instance, in DAS 1,729,373 and known as "Shear Torpedoes". A further suitable device is described in DAS 1,778,515 and also in DOS 2,119,136 known in the trade as "Dissipatormanschette". However, it has been found and is accepted in the industry that devices which operate satisfactorily with single screw extruders cannot be successfully used with screw extruders having two or more parallel screws.

It has been attempted to solve the problem of providing a uniform field of shear forces in twin-screw extruders by providing a cylindrical roller member on each screw shaft. A device of this kind is disclosed in DAS 1,084,907. However, this solution has not been found satisfactory since, for reasons of manufacturing and stress difficulties particularly within the intermeshing range of the screw shafts, the width of the shear gaps cannot be maintained to be constant; more specifically, the shear gaps tend to become considerably enlarged. As a result, the shear forces acting upon the material to be processed are irregular. Moreover, due to relative movement of the two parallel screw shafts, the field of shear forces is not homogeneous. Any attempt to apply this solution upon parallel meshing screws of a twin screw extruder of the general kind referred to has resulted in a complete failure.

THE INVENTION

It is a broad object of the present invention to provide a novel and improved twin-screw extruder of the general kind above referred to and, in particular, a twin-screw extruder the extruder screws of which are in mesh so that material to be processed is subjected to a powerful and uniform field of shear forces.

A more specific object of the invention is to provide a novel and improved twin-screw extruder of the general kind above referred to in which the field of shear forces can be conveniently and accurately adjusted in accordance with the specific requirements of the material to be processed without in any way affecting the uniformity of the shear forces.

SUMMARY OF THE INVENTION

The afore-pointed out objects, features and advantages and other objects, features and advantages which will be pointed out hereinafter are obtained by providing a twin-screw extruder with at least two screw shafts which are rotatably supported in cylindrical intersecting bores in the casing of the extruder. Each of the extruder shafts includes a section which is free of flights and faces the other section. An inner bushing on each shaft and an outer bushing for each inner bushing are mounted within the casing and define therebetween an annular shear gap of uniform radical width along its entire length. As it is evident, the shear forces generated by and within the gaps are constant due to the uniformity of the width of the gaps.

According to one aspect of the invention, each inner bushing and each outer bushing are of cylindrical configuration. Such cylindrical bushings can be very accurately and inexpensively manufactured.

Another aspect of the invention provides that the outer wall surface of each inner bushing and the inner wall surface of each outer bushing are tapered or conically shaped, the slant of these wall surfaces being such that the uniform width of the shear gaps is maintained along the entire length of the gaps. Such conical configuration of the bushings permits a convenient varying of the radial width of the shear gaps while maintaining the uniform width thereof by axially displacing the bushings relative to each other, for instance by either displacing the casing relative to the screw shafts or vice versa.

The advantages of an extruder according to the invention, and particularly of the shear elements thereof, are that a homogeneous or uniform field of shear forces can be generated and maintained by very simple and inexpensive structural components. Moreover, the homogenity of the generated field of shear forces is independent of the intensity thereof. As a result, processing of materials is practically perfectly uniform. The force of the shear action can be controlled by simply exchanging the inner and/or outer bushings. In the event conically shaped bushings are used, as previously described, it is not even necessary to exchange bushings but the width of the gaps can be accurately varied by axial displacement of the bushings relative to each other.

The invention also provides that bending of very long screw shafts supported at one end only can be prevented or at least impeded by placement of the shear gaps close to the end of the screw shafts.

BRIEF DESCRIPTION OF THE INVENTION

In the accompanying drawing several embodiments of the invention are shown by way of illustration and not by way of illustration.

IN THE DRAWING

DETAILED DESCRIPTION OF THE INVENTION

Figure 1:
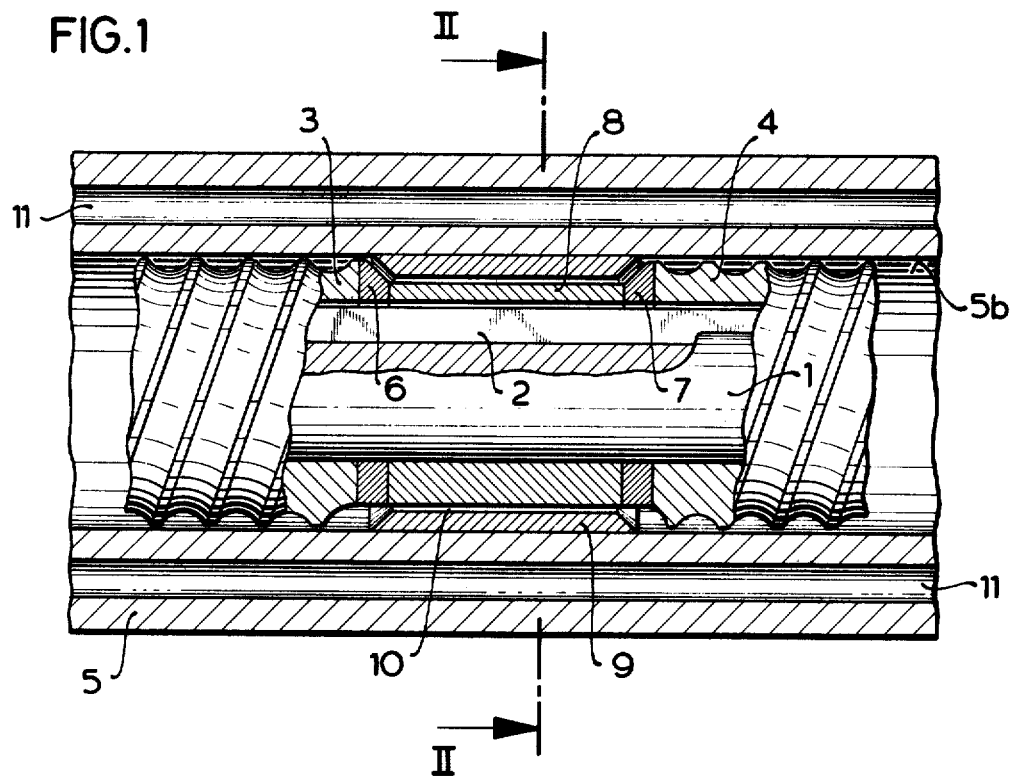
FIG. 1 is a fragmentary lengthwise section of a part of a screw extruder having a shear element including a cylindrical annular gap.

Referring now to the figures in greater detail, and first to FIG. 1, this figure shows a twin-screw extruder comprising a screw shaft 1 mounting screw flights 3 and 4. These flights are part of or secured to bushings or sleeves which are keyed to the shaft by suitable means such as keys 2. The screw shaft assembly is rotatably mounted in a casing 5 which includes two parallel bores 5b, only one being shown in FIG. 1. An inner bushing 8 is axially interposed between screw flights 3 and 4 and is separated from the screw flights by annular disks 6 and 7. Bushing 8 is secured to shaft 1 by keys 2 and surrounded by an outer bushing 9 inserted into the casing slidable therein. The bushings are dimensioned so that an annular gap 10 is defined between inner bushing 8 and outer bushing 9. The bushings have cylindrical inner and outer peripheral walls respectively and, hence, annular gap 10 also has a cylindrical configuration.

Casing 5 includes preferably a plurality of ducts 11 through which a liquid of vaporized heating or cooling medium can be circulated.

Figure 2:
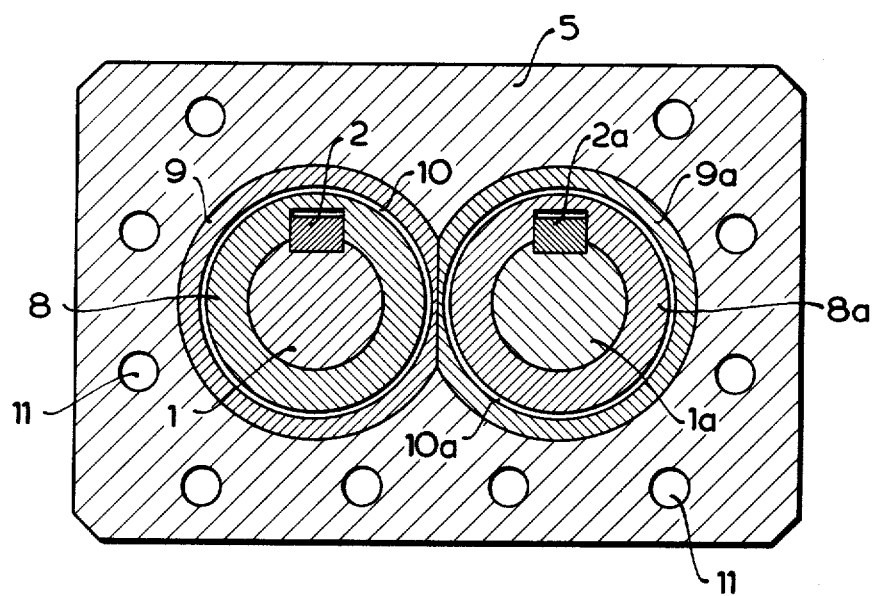
FIG. 2 is a cross section of the screw extruder according to FIG. 1 taken on line 11—11.

Referring to FIG. 2, this figure shows the two parallel disposed screw shafts 1 and 1a. This figure also shows that the screw flights on the two shafts are in mesh. The outer apex diameter of the flights corresponds to the inner diameter of casing bores 5b and, thus, also, to the outer diameters of outer bushings 9 and 9a, disregarding the play required for smooth rotation of the shafts, but not to the distance between the center axes of shafts 1 and 1a. This distance is somewhat smaller and, accordingly, the two outer bushings 9 and 9a must be flattened on their outside surfaces within the range of engagement of the bushings as it is shown in FIG. 2. Such flattening automatically prevents turning of the outer bushings relative to casing 5 and the inner bushings 8 and 8a.

FIG. 2 further shows that the annular gaps 10 and 10a are completely uniform along their entire periphery. In other words, there is no change in the width of the gap within the flattened range of bushings 9 and 9a between the two shafts.

Figure 3:
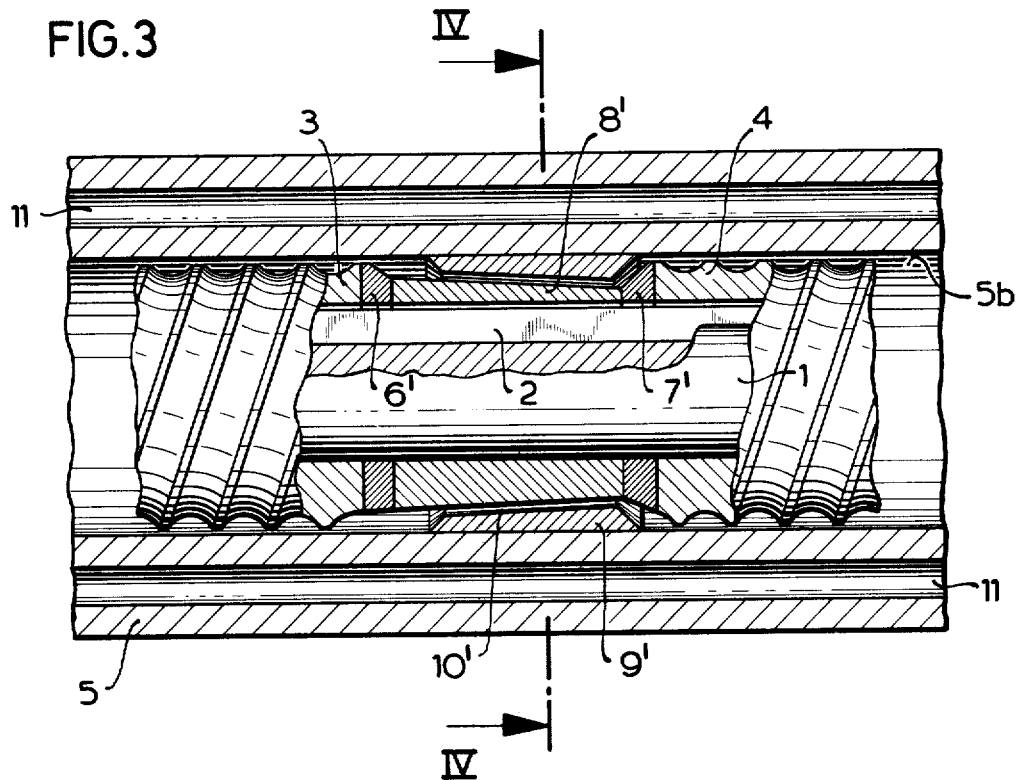
FIG. 3 is a fragmentary lengthwise section of a screw extruder having a modified shear element including a conical cylindrical gap.
Figure 4:
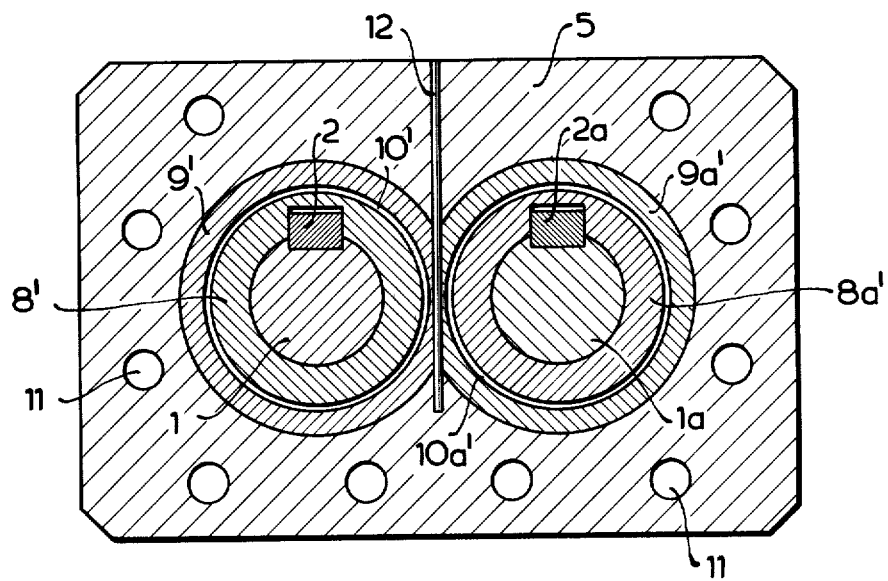
FIG. 4 is a cross section of the screw extruder according to FIG. 3 taken on line IV—IV.

The width of gaps 10 and 10a can be readily changed by exchanging the inner bushings or outer bushings so that the gap can be selected in accordance with the specific requirements of the operation to be carried out with the screw extruder. Setting of the screw extruder for the specific requirements of the operation and the properties of material to be processed can be still more simplified by the shear elements shown in FIGS. 3 and 4. As shown in these figures, the inner bushings 8' and 8a' which are slid upon screw shafts 1 and 1a, comprise conically shaped outer peripheral surfaces and the outer bushings 9' and 9a' surrounding the inner bushings have correspondingly shaped inner conical surfaces. Accordingly, displacement of the outer bushings and the inner bushings relative to each other results in a corresponding change in the width of the gaps 10' and 10a' but the width of the gap remains constant for its entire length. Due to the rather shallow slant of the conical surfaces, fine adjustment of the width of the gap can be readily obtained.

The conical annular gaps 10' and 10a' can be adjusted by various types of suitable setting means. For instance, according to FIG. 4, a bolt 12 secures the outer bushings 9' and 9a' to casing 5. Accordingly, by displacement of casing 5 in axial direction without also displacing the screw shafts, the width of annular gaps 10' and 10a' is correspondingly changed. It is also conveniently possible to maintain casing 5 in stationary position and to displace the screw shafts axially relative thereto. Both possibilities of varying the width of the annular gaps by axial displacement of the casing or the shafts relative to each other in combination with the shear elements according to the invention permits a highly sensitive and uniform control of dosing or metering of additives or other materials.

The reference characters in FIGS. 1 and 2 have the explained significance. All duplications of components are indicated by priming the respective reference characters.

With screw extruders which have very long and only at one end journalled screw shafts, usually at the inlet end, an extremely heavy load may cause the shafts to be slightly bent due to the pressure of the material to be processed upon the free end of the shafts. If such deformation of the shafts is likely, provision of a shear element according to the invention at the free end of the shafts is found to be advantageous. Such shear element performs a bearing function in addition to its action as shear and homogenizing component.

Figure 5:
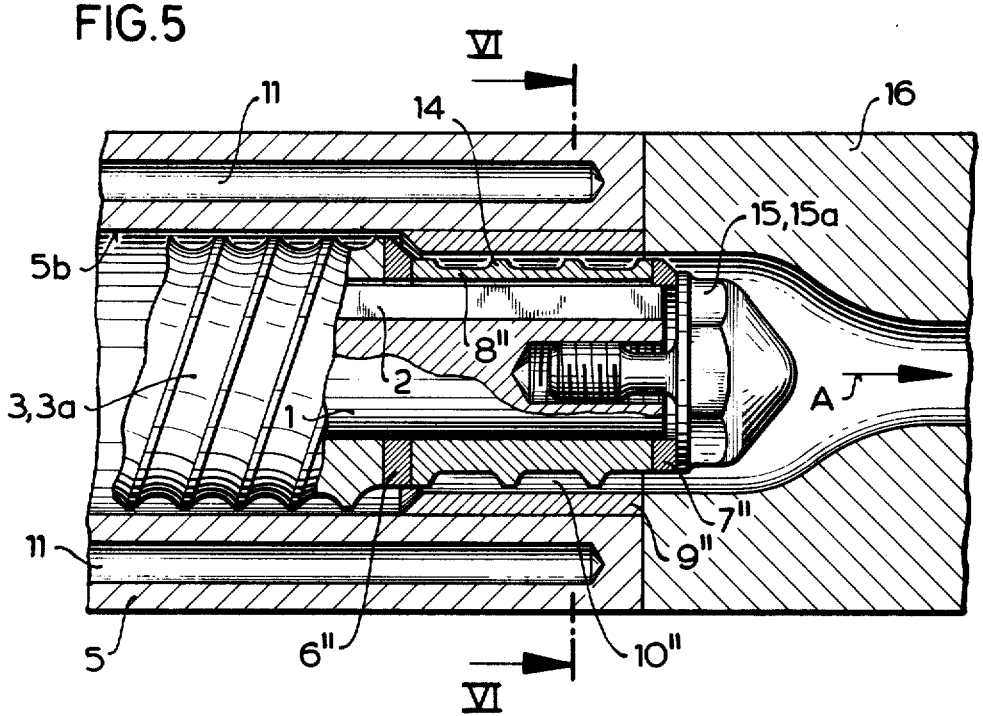
FIG. 5 is a fragmentary lengthwise section of the discharge end of a screw extruder showing a further modification of the shear element.
Figure 6:
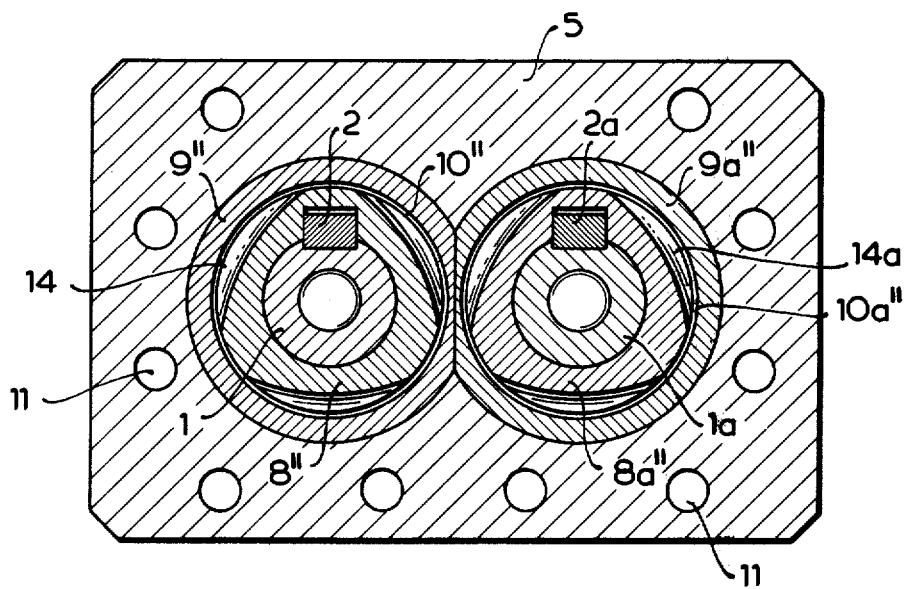
FIG. 6 is a cross section of the screw extruder according to FIG. 5 taken on line VI—VI.

The function of the shear element as a bearing component can be further improved by providing on the outside wall of inner bushings 8' and 8a'' screw turns 14 and 14a, as it turns in FIGS. 5 and 6. The annular gaps 10'' and 10a'' are thus enlarged in the manner of screw turns between screw turns 14 and 14a. As it is apparent from the generally triangular cross sections of inner bushings 8'' and 8a'' (FIG. 6), it is apparent that the illustrated embodiment has triple gang screw turns. In this embodiment, the annular gaps 10'' and 10a'' are completely uniform in sectional planes parallel to screw turns 14 and 14a. Hence, the field of shearing forces is also completely homogeneous.

With this arrangement of the shearing element, cut-in screw turns 14 and 14a can be arranged by a suitable selection of the length of the inner and outer bushings so that they supply practically the entire required pressure at the discharge end of the screw extruder. As a result, the remaining screw flights 3 and 3a on screw shafts 1 and 1a need not participate appreciably in the pressure build-up and are hence not exposed to lateral forces.

The inner bushings 8'' at the ends of the shafts (in FIG. 5 inner bushings 8a'' are disposed above the plane of the drawing and are hence not visible), screw elements 3(and 3a) and transition forming disks 6'' and 7'' are secured by shaped nuts known as screw tips 15 and 15a. These nuts are threaded into the ends of shafts 1 and 1a.

An intermediate casing section 16 constitutes the transition from the twin-bores 5b to aa discharge opening or nozzle (not shown). Arrow A indicates the flow direction of the material to be processed.

The invention as hereinbefore described is, of course, also applicable to extruders having more than two screws.

When the described screw-shaped enlargements of the shear gaps 10" and 10a" are not disposed in the inner bushings but in the outer bushings 9a and 9a", the advantageous operation of the shear elements as described hereinbefore is fully retained.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A screw extruder for processing materials of pliable consistency, said screw extruder comprising in combination:

an elongate casing including two parallel lengthwise bores of cylindrical configuration and intersecting each other;

a screw shaft mounting screw flights rotatably mounted in each bore, the screw flights on the shafts being in mesh and each shaft having intermediate its length a flight-free section, said sections being disposed in juxtaposition;

an inner bushing fitted upon each flight-free shaft section secured thereto against rotation and an outer bushing secured against rotation to the inside wall portion of the casing in radial registry with the respective inner bushing and coaxial therewith, the outer circumferential wall of each inner bushing and the inner circumferential wall portion of each outer bushing being correlated to define therebetween a shear gap of uniform radial width.

2. The screw extruder according to claim 1 wherein the outer wall of each inner bushing and the inner wall of each outer bushing are cylindrical along the axial lengths thereof.

3. The screw extruder according to claim 1 wherein the outer wall of each inner bushing and the inner wall of each outer bushing are each conically slanted, the angles of said slants being such that the gaps defined by said walls are of uniform width along their entire lengths.

4. The screw extruder according to claim 3 wherein said casing and said outer bushings are axially displaceable relative to the screw shafts and the inner bushing, thereby correspondingly varying the radial width of said shear gaps while maintaining the uniformity of the gaps' width along the entire length thereof.

5. The extruder according to claim 3 wherein the screw shafts in unison with the inner bushings are axially displaceable relative to the outer bushings secured to the inside of the casing.

6. The screw extruder according to claim 3 wherein the outer bushings are axially displaceable relative to the inner bushings and to the casing, and setting means accessible from the outside of the casing are coupled to the outer bushings to effect axial displacement thereof.

7. The screw extruder according to claim 1 wherein each of said screw shafts is supported at one end only, and wherein said inner and outer bushings are located adjacent to the free ends of said shafts.

8. The screw extruder according to claim 7 wherein the outer peripheral surface of each inner bushing includes screw turns.

* * * * *